United States Patent

Hiscock et al.

(10) Patent No.: US 9,532,286 B2
(45) Date of Patent: Dec. 27, 2016

(54) CONTROLLING COMMUNICATION OF DATA FOR DIFFERENT USER PERSONAS

(75) Inventors: James S. Hiscock, Rockport, MA (US); Paul T. Congdon, Granite Bay, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 866 days.

(21) Appl. No.: 13/524,290

(22) Filed: Jun. 15, 2012

(65) Prior Publication Data
US 2013/0336284 A1 Dec. 19, 2013

(51) Int. Cl.
| G06F 15/173 | (2006.01) |
| H04W 36/14 | (2009.01) |
| H04W 8/18 | (2009.01) |
| H04W 76/02 | (2009.01) |

(52) U.S. Cl.
CPC ............. *H04W 36/14* (2013.01); *H04W 8/183* (2013.01); *H04W 76/026* (2013.01)

(58) Field of Classification Search
CPC ...... H04W 36/14; H04W 88/06; H04W 48/18; H04W 8/18; H04W 76/026; H04W 8/183; H04L 67/306; H04M 1/72563; H04M 11/00; G06F 17/30283
USPC .................................................. 709/202, 225
See application file for complete search history.

(56) References Cited

U.S. PATENT DOCUMENTS

| 7,391,748 | B2 | 6/2008 | Feather |
| 7,835,743 | B2 | 11/2010 | Zhang |
| 8,768,298 | B1 * | 7/2014 | Tusnial .................. 455/406 |
| 2005/0013264 | A1 * | 1/2005 | Sundberg .................. 370/328 |
| 2008/0081606 | A1 | 4/2008 | Cole |
| 2009/0215447 | A1 * | 8/2009 | Catalano et al. .......... 455/432.1 |
| 2010/0290398 | A1 | 11/2010 | Choudhary |
| 2010/0313009 | A1 | 12/2010 | Combet |
| 2011/0045798 | A1 | 2/2011 | Dietz |
| 2011/0213688 | A1 | 9/2011 | Santos |
| 2012/0084184 | A1 * | 4/2012 | Raleigh et al. ................. 705/30 |
| 2013/0288741 | A1 * | 10/2013 | Sjadieh et al. ............. 455/552.1 |
| 2013/0329639 | A1 * | 12/2013 | Wietfeldt .............. H04W 88/06 370/328 |

OTHER PUBLICATIONS

Perkins, Network Working Group, IP Mobility Support for IPv4, Jan. 2002 (106 pages).
Kim et al., Improving TCP Performance over Wireless Networks with Collaborative Multi-homed Mobile Hosts, 2005 (14 pages).
CISCO, White Paper, The Future of Hotspots: Making Wi-Fi as Secure and Easy to Use as Cellular, dated earlier than May 2012 (9 pages).
Armbrust et al., Above the Clouds: A Berkeley View of Cloud Computing, Feb. 2009 (25 pages).

(Continued)

*Primary Examiner* — Mohamed Ibrahim
(74) *Attorney, Agent, or Firm* — Brooks, Cameron & Huebsch, PLLC (57) ABSTRACT

Data for a first persona of a user of an electronic device is communicated in a first access network, according to a first agreement between the user and a first service provider of the first access network. Data for a second, different persona of the user is communicated in the first access network, according to a second, different agreement.

13 Claims, 6 Drawing Sheets

(56) References Cited

OTHER PUBLICATIONS

Cuervo et al., Maui: Making Smartphones Last Longer with Code Offload, Jun. 2010 (14 pages).
Ra et. al., Odessa: Enabling Interactive Perception Applications on Mobile Devices, Jul. 2011 (14 pages).
Wolbach et al., Transient Customization of Mobile Computing Infrastructure, CMU-CS-08-117, Apr. 2008 (11 pages).
Congdon et al., International Application No. PCT/US12/42628 entitled Communicating Data Associated With Different Personas of a User filed Jun. 15, 2012 (26 pages).
CISCO, Administration Guide for CiscoMobile 8.1 and 8.0 for iPhone, Jan. 2012 (47 pages).
Brian Madden's ConsumerizeIT.com—Blog—BYOD Smackdown 2012: MaaS360 checks all the boxes (MDM, MIM, and MAM) from the cloud, Apr. 2012 (2 pages).
www.networkworld.com—Debate rages over how to manage personal mobile devices used for work, Jul. 2011 (3 pages).
Satyanarayanan et al., The Case for VM-based Cloudlets in Mobile Computing, Oct. 2009 (10 pages).
Kim et al., Wireless Networks 11, A Receiver-Centric Transport Protocol for Mobile Hosts with Heterogeneous Wireless Interfaces, 2005 (20 pages).

\* cited by examiner

CONTROLLING COMMUNICATION OF DATA FOR DIFFERENT USER PERSONAS

BACKGROUND

A user can use an electronic device in various different roles. For example, the electronic device may be used by the user in both a work context (such as part of the user's employment by an enterprise) or in a personal context (for personal communications such as personal e-mails, social networking posts, and so forth).

BRIEF DESCRIPTION OF THE DRAWINGS

Some embodiments are described with respect to the following figures.

DETAILED DESCRIPTION

Some enterprises (e.g. business concerns, government agencies, educational organizations, etc.) allow a user to use a common electronic device (either the user's personal electronic device or the user's work electronic device) for tasks relating to different roles of the user. The different roles of the user can correspond to different personas of the user, where the different personas can include, as examples, a work persona that relates to communications of the user associated with work for an enterprise, and a personal persona relating to personal communications (e.g. personal e-mails, social networking posts, etc.) of the user. The user can also have other personas, such as another persona relating to charity work by the user, a further persona associated with being a member of a sports league, and so forth.

It may be possible for an electronic device to attach to multiple different access networks, including an enterprise access network (associated with the enterprise that a user works for), a public access network (e.g. a wireless access network of a cellular network service provider, a WiFi hotspot provided by another service provider, etc.), or another type of access network.

Various issues can arise in scenarios where an electronic device is able to communicate data associated with different user personas, and in addition is able to roam across different access networks, including, as examples, an enterprise access network, a public access network, and so forth. Security of certain data in the foregoing scenario can be a concern, such as when data for a work persona of a user is being communicated while the electronic device is attached to a public access network. Another issue involves determining what resources of respective access networks to allocate for use in communicating data of the electronic device (for different user personas) as the electronic device roams across the different access networks.

In accordance with some implementations, techniques or mechanisms are provided to control data communication for different personas of a user of an electronic device, according to a respective collection of agreements. For example, the collection of agreements can include an agreement between the user and a first service provider of a first access network, an agreement between the user and a second service provider of a second access network, and an agreement between the first and second service providers. An "agreement" can include a term of service that governs rights, privileges, and/or resources associated with communication of data over an access network provided by a service provider. As examples, the "rights" can define the types of communication allowed (e.g. voice call, e-mail, web browsing, etc.), the "privileges" can define a quality of service or class of service available to the user, and "resources" can refer to physical and logical resources of a communication infrastructure that can be allocated for communications of the user.

Figure 1:
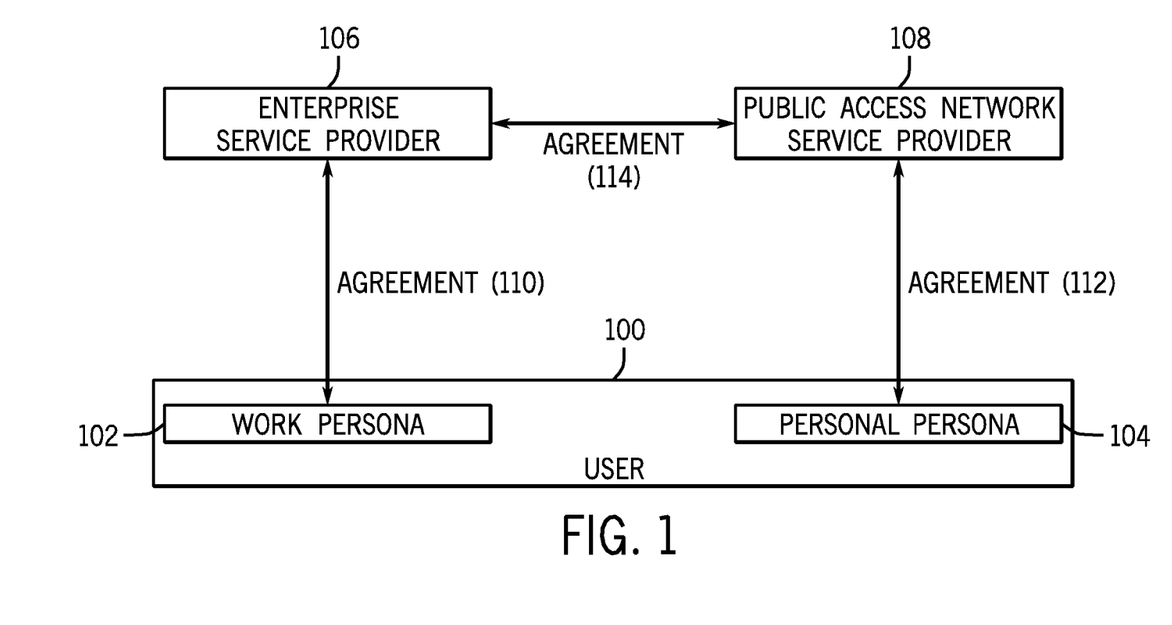
FIG. 1 is a schematic diagram of multiple personas and multiple service providers, and corresponding agreements, in accordance with some implementations.

FIG. 1 illustrates an example of the multi-way agreements that can govern communication of data for different personas of a user 100. The user 100 has a work persona 102 and a personal persona 104. The work persona 102 has an agreement 110 with an enterprise service provider 106, while the personal persona 104 has an agreement 112 with a public access network service provider 108. In addition, the enterprise service provider 106 and public access network service provider 108 has an agreement 114 between each other. More generally, in further examples, the multiple personas of the user 100 can have multiple corresponding agreements with a given service provider. For example, both the work persona 102 and personal persona 104 can have respective different agreements with the public access network service provider 108 (e.g. the public access network service provider 108 can assign two different telephone numbers to the respective different personas). In another example, both the work persona 102 and personal persona 104 of the user 100 can have respective different agreements with the enterprise service provider 106 (e.g. the enterprise service provider 106 can assign two different user accounts to the respective different personas). In the ensuing discussion, although it is assumed that each persona has a respective agreement with a given service provider, it is possible that in further examples multiple personas can have respective multiple agreements with the given service provider.

An example of the agreement 112 can be a subscription agreement entered into between the user 100 (and more specifically the personal persona 104 of the user 100) and the public access network service provider 108 (the subscription agreement allows the user to subscribe to services of the public access network service provider 108). An example of the agreement 110 can include policies set by the enterprise service provider 106 for workers (e.g. employees or contractors) of an enterprise, where the policies can govern the use and access rights of an enterprise access network provided by the enterprise, based on credentials of the workers.

The agreement 114 (which can be referred to as a roaming agreement) between service providers govern the manner in which one service provider provides network access to users of another service provider. The agreement 114 between the service providers can also specify a policy relating to how handoff of an electronic device between different access networks is to be performed as the electronic device roams between different geographic locations. As examples, the policy can specify condition(s) under which handoff is allowed, security mechanisms to employ in the destination access network after handoff is performed, and so forth.

In some implementations, the data for a given persona associated with an electronic device is primarily communicated over a particular access network. For example, the data for the work persona 102 associated with the electronic device is primarily communicated over the enterprise access network, and such communication is governed by the agreement 110 between the user 100 (and more specifically the work persona of the user) and the enterprise service provider 106. The work persona 102 of the user is thus considered the primary persona for the enterprise access network, since the work persona 102 has a direct agreement 110 with the enterprise service provider 106. A "direct agreement" refers to an agreement based on a specific relationship that exists between two parties (such as provider and customer, or employee and employer, or supplier and client).

As another example, the data for the personal persona 104 is primarily communicated over the public access network, and such communication is governed by the agreement 112 between the user 100 (and more specifically the personal persona 104 of the user) and the public access network service provider 108. The personal persona 104 of the user is thus considered the primary persona for the public access network, since the personal persona 104 has a direct agreement 112 with the public access network service provider 108.

From the perspective of a particular access network, there is at least a primary persona of the user, and a secondary persona of the user. For example, the primary persona of the user for the enterprise access network is the work persona 102, while the secondary persona of the user is the personal persona 104 (since the personal persona does not have a direct agreement with the enterprise service provider). Similarly, the primary persona of the user for the public access network is the personal persona 104, while the secondary persona of the user is the work persona 102 (since the work persona does not have a direct agreement with the public service provider).

In some implementations, the usage of the particular access network for communication of data of the secondary persona of the user is governed by a term of service specified in the agreement 114 between the service providers. In further implementations, where both the primary and secondary personas of the user have respective different agreements with a given service provider of the particular access network, then the usage of the particular access network for communication of data of the secondary persona is governed by a term of service in the agreement between the secondary persona and the given service provider.

Thus, in a particular access network, the control of communication of data for the primary persona of the user is governed by the agreement between the primary persona of the user and the corresponding service provider, while the control of communication of data for the secondary persona of the user is governed by the agreement between service providers, or alternatively, is governed by the agreement between the secondary persona and the corresponding service provider. For example, in the enterprise access network, control of communication of data related to the work persona 102 of the user is according to the agreement 110 between the work persona 102 of the user and the enterprise service provider 106, while control of communication of data related to the personal persona 104 of the user is according to the agreement 114 between the enterprise service provider 106 and the public access network service provider 108, or alternatively, between the personal persona 104 of the user and the enterprise service provider 106.

An agreement can include the following example information: information relating to the user, such as the name of the user, billing information (e.g. credit card to charge, bank account to charge, etc.), user credentials, and contact information; services and access information that define rights, privileges, and/or resources for communicating data; and connection type information that contains network connection policies for network access and transport of data to and from the electronic device.

Although the foregoing examples assume the presence of just two personas (a primary persona and a secondary persona) of a user when communicating over a particular access network, it is noted that in other examples, there can be more than two personas involved, in which case there would be a primary persona and multiple secondary personas.

Moreover, in examples that involve more than two access networks associated with corresponding different service providers, there can be additional agreements between the user and each respective service provider, as well as between or among different combinations of the different service providers. For example, there can be one-to-one agreements between corresponding pairs of service providers. As another example, there can be a multi-party agreement that governs some agreed parameters or procedures among the multiple service providers. Provisions in the multi-party agreement can possibly be supplemented or overridden by various one-to-one agreements between service providers.

By specifying terms of service in corresponding agreements for communication of data associated with different personas of a user of an electronic device as the electronic device roams across different access networks, security associated with data relating to at least one persona of the user can be maintained, and rights, privileges, and/or resources for communication of data over the access networks can be defined. A public access network service provider can benefit from communicating data offloaded from an enterprise access network since users are more likely to stay with the public access network service provider if the users can use the public access network to communicate data relating to a work persona of the user. The enterprise service provider benefits from ensuring that secure communications can be achieved over a public access network for data relating to the work persona of the user. Both the enterprise and public access network service providers benefit from increased user satisfaction due to flexibility of communicating data associated with the different personas of the user across different access networks.

Figure 2:
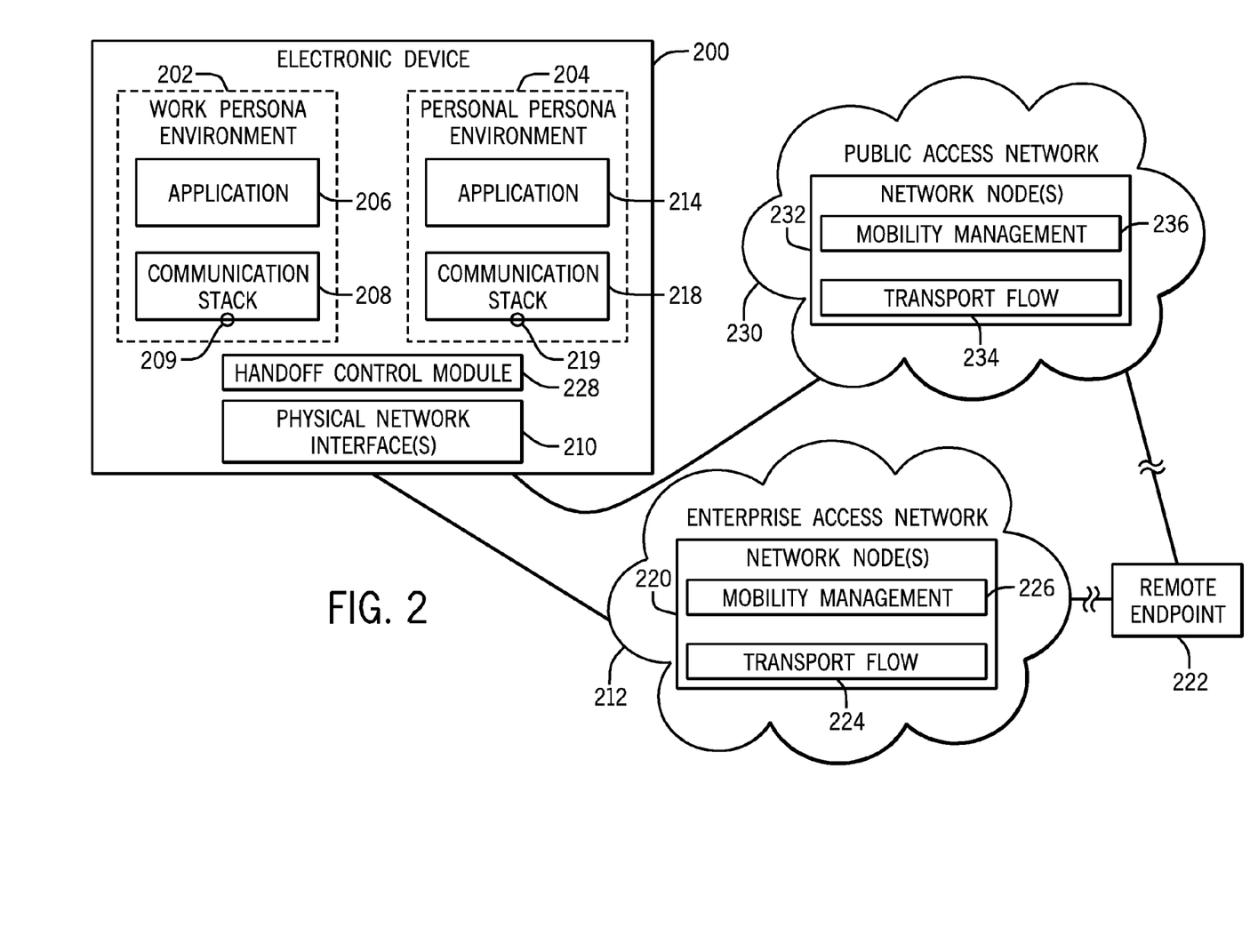
FIG. 2 is a block diagram of an example network arrangement that incorporates some implementations.

FIG. 2 is a block diagram of an example network arrangement that includes an electronic device 200 that is capable of communicating over an enterprise access network 212 and a public access network 230. In some examples, the electronic device 200 can include a mobile device, such as a smartphone, a personal digital assistant (PDA), a tablet computer, a notebook computer, and so forth. In other examples, the electronic device 200 can be a desktop computer, game console, or some other type of electronic device.

The electronic device 200 includes multiple environments for respective different personas of a user of the electronic device 200. In the example of FIG. 2, two environments 202, 204 are depicted, where the environment 202 is for a work persona of the user, and the environment 204 is for the personal persona of the user. Although just two environments 202, 204 are depicted for the work and personal personas, respectively, of a user, in the FIG. 2 example, it is noted that in other examples, additional or alternative environments can be provided for other personas of the user.

The different environments 202, 204 can be different virtual or logical environments defined in the electronic device 200. As examples, each environment 202, 204 can be a virtual machine, which can refer to a partition or segment of a physical machine (such as the electronic device 200). A virtual machine virtualizes or emulates a physical machine. From the perspective of a user or application, a virtual machine can look just like a physical machine. A virtual machine can include one or multiple applications, and other components, such as an operating system, device drivers, and so forth.

In different examples, the environments 202 and 204 can be implemented with different types of partitions in the electronic device 200.

The work persona environment 202 includes at least one application 206 (e.g. web browser, word processing application, spreadsheet application, etc.) and a communication stack 208. The application 206 is used by the user as part of the work persona of the user. The communication stack 208 is used for communicating (transmitting and/or receiving) data associated with the work persona of a user with a physical network interface 210 is used to communicate data of the electronic device 200 over a network 212.

Note that there can be one physical network interface 210, or multiple physical network interfaces, in the electronic device 200. A physical network interface 210 can be a physical wireless network interface to allow the electronic device 200 to communicate wirelessly with the network 212. Alternatively, the physical network interface 210 can be a wired physical network interface for wired connection to the network 212. In some examples, the physical network interface 210 can be implemented as a network interface card.

The personal persona environment 204 similarly includes at least an application 214 and a communication stack 218. The communication stack 218 in the environment 204 is used for communicating data associated with the personal persona of the user with the physical network interface 210. In examples where there is just one physical network interface 210, the physical network interface 210 is shared by the communication stacks 208 and 218 in the different environments 202, 204. In examples where there are multiple physical network interfaces 210, then different ones of the physical network interfaces 210 can be used for communicating data with respective different ones of the communication stacks 208 and 218 in the environments 202 and 204, respectively.

Each of the environments 202 and 204 can also include other modules, such as an operating system (not shown), and so forth.

As further shown in FIG. 2, the enterprise access network 212 includes network node(s) 220 for routing data through the enterprise access network 212. The network node(s) 220 can include an access point (e.g. wireless or wired access point) and other network node(s), as examples. As examples, such other network node(s) can include any one or combination of switch, router, a firewall, a load balancer, and so forth.

A remote endpoint 222 (which can be another electronic device or a server, as examples) is coupled to the enterprise access network 212. The network nodes 220 can communicate data between the electronic device 200 and the remote endpoint 222.

The network node(s) 220 of the network 212 can include a transport flow module 224, which is able to establish multiple transport flows for communicating respective data of the work persona environment 202 and personal persona environment 204, respectively. As discussed further below, different logical network connection points can be established in the electronic device 200, such as at the communication stacks 208 and 210, for the multiple transport flows. The transport flow module 224 in the network node(s) 220 is able to separate data from the electronic device 200 into the multiple transport flows, depending upon which logical network connection point the data is associated with.

The network node(s) 220 can also include a mobility management module 226, which can be used to manage mobility of the electronic device 200 as the electronic device 200 roams across different access networks (such as 212 and 230). For example, the mobility management module 226 can manage handoff of the electronic device 200 from a source wireless access network to a destination wireless access network, such as when the electronic device 200 crosses a boundary between different coverage areas of the corresponding wireless access networks. The mobility management module 226 of the network node(s) 220 can interact with a handoff control module 228 in the electronic device 200 for performing the handoff operations.

The public access network 230 similarly includes network node(s) 232, which can include a transport flow module 234 and mobility management module 236 that have similar functionalities as the corresponding modules 224 and 226 in the network node(s) 212 of the enterprise access network 212.

The communication stack 208 or 218 can have various alternative implementations, and can include various layers. For example, the communication stack 208 or 218 can include an Internet Protocol (IP) layer and a Medium Access Control (MAC) layer.

An IP layer performs network communications using IP packets, where each IP packet contains source and destination IP addresses to identify a source network device and a destination network device. The IP addresses are used to route the IP packets through the access network 212 or 230.

A MAC layer is a data link layer that provides addressing and channel access control mechanisms to allow for multiple network devices to communicate over a shared network. The MAC layer can use MAC addresses for communicating data frames between a source network device and a destination network device.

It is noted that the IP layer is above the respective MAC layer in the corresponding communication stack 208 or 218. An IP packet generated by an IP layer is carried in the payload section of a MAC frame produced by a MAC layer.

In further implementations, the communication stack 208 or 218 can further include an upper layer above the IP layer. In some examples, the upper layer can be a Transmission Control Protocol (TCP) layer, which is used to establish a connection with a peer or counterpart TCP layer at a remote network device. TCP provides reliable, ordered delivery of data units between endpoints. In other examples, different types of upper layers can be employed.

The communication stacks 208 and 218 can communicate data in respective separate transport flows established by the transport flow module 224 or 234 in the enterprise or public access network 212 or 230. A "transport flow" refers to a session, stream, or connection that allows for an exchange of data between or among at least two endpoints in a network. In some examples, a transport flow can be in the form of a logical network, such as a virtual local area network (VLAN) or other type of logical network, a Multi-Protocol Label Switching (MPLS) label-switched path (LSP) network, a pseudo-wire (which provides an emulation of a point-to-point connection over network), an Internet Protocol (IP)-security virtual private network (VPN) (a virtual private network protected by the IP-security or IPsec protocol), and so forth. One or multiple logical networks can be defined on a physical network that includes physical network infrastructure, which can include communication nodes such as switches or routers, and interconnection links between the communication nodes.

Logical network connection points 209 and 219 can be defined at the communication stacks 208 and 218, respectively. The logical network connection points 209 and 219 can be defined at any of various different layers in the communication stacks. A logical network connection point can refer to a point in the electronic device 200 to which a transport flow is established. In some examples, a logical network connection point can be defined at a MAC layer, such that the logical network connection point is identified by a corresponding MAC address associated with the MAC layer. In such examples, the two logical network connection points 209 and 219 of the respective communication stacks 208 and 218 are identified by respective different MAC addresses associated with the corresponding MAC layers. A transport flow for carrying data associated with the work persona environment 202 is established with the logical network connection point 209 of the communication stack 208, whereas a transport flow of data for the personal persona environment 204 is established with the logical network connection point 219 of the communication stack 218.

In alternative examples, the logical network connection points 209 and 219 can be defined at respective IP layers in the communication stacks 208 and 218. Providing logical network connection points 209 and 219 at the IP layers of the communication stacks 208 and 218, respectively, causes transport flows of data for the work persona environment 202 and personal persona environment 204, respectively, to be routed to IP addresses associated with the respective IP layers.

In further examples, the logical network connection points 209 and 219 can be defined at upper layers of the communication stacks 208 and 218 above the IP layers. Providing a logical network connection point at an upper layer, such as a TCP layer, results in a transport flow being established with an identifier associated with such upper layer, such as a TCP port, for example.

More generally, logical network connection points can be identified by one or some combination of at least the following: MAC addresses, IP addresses, TCP ports, and so forth.

Figure 3:
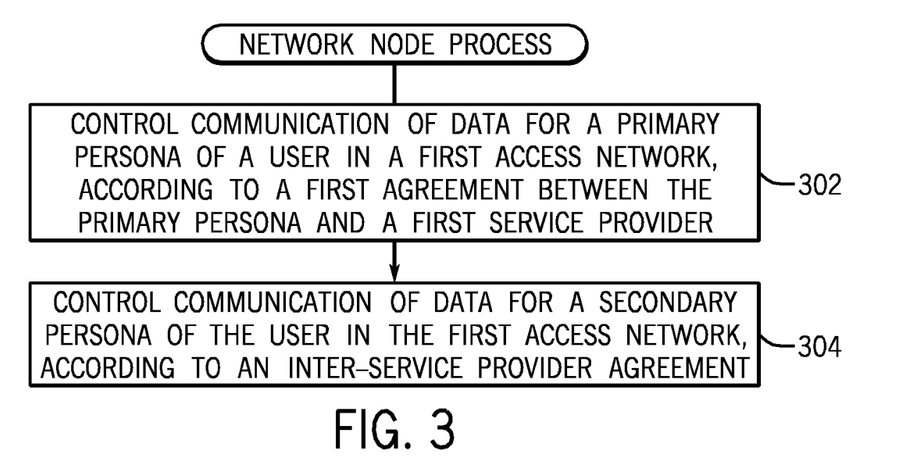
FIG. 3 is a flow diagram of a process of a network node, according to some implementations.

FIG. 3 is a flow diagram of a process performed by a network node in an access network, which can be either the enterprise access network 212 or the public access network 230. The process of FIG. 3 can be performed by the transport flow module 224 or 234 (FIG. 2) in the network node, for example. The network node controls (at 302) communication of data for a primary persona of a user of an electronic device in a first access network (the enterprise access network 212 or the public access network 230). The primary persona can be the work persona or the personal persona in some examples. The controlling performed at 302 is according to a first agreement between the primary persona of the user and a first service provider of the first access network.

The network node further controls (at 304) communication of data for a secondary persona of the user in the first access network. Note that the second persona can be the other one of the work persona and the personal persona according to some examples. In implementations according to FIG. 3, the controlling of data for the secondary persona is according to an inter-service provider agreement between the first service provider and a second service provider of a second access network.

In alternative implementations, the control of communication of data for a secondary persona of the user in the first access network, as performed in 304, can be according to an agreement between the secondary persona and the first service provider. Such alternative implementations assume that both the primary and secondary personas of the user have corresponding agreements with the first service provider.

Note that the secondary persona of the user in the first access network is the primary persona of the user in the second access network. Moreover, note that the communication of data for the primary persona and the secondary persona are performed in respective separate transport flows over the physical network infrastructure of the first access network.

The control of data communication according to a given agreement is based on rights, privileges, and/or resources specified in the given agreement. As noted above, the control of data communication can also be according to connection type information in the agreement that contains network connection policies for network access and transport of data to and from the electronic device.

Figure 4:
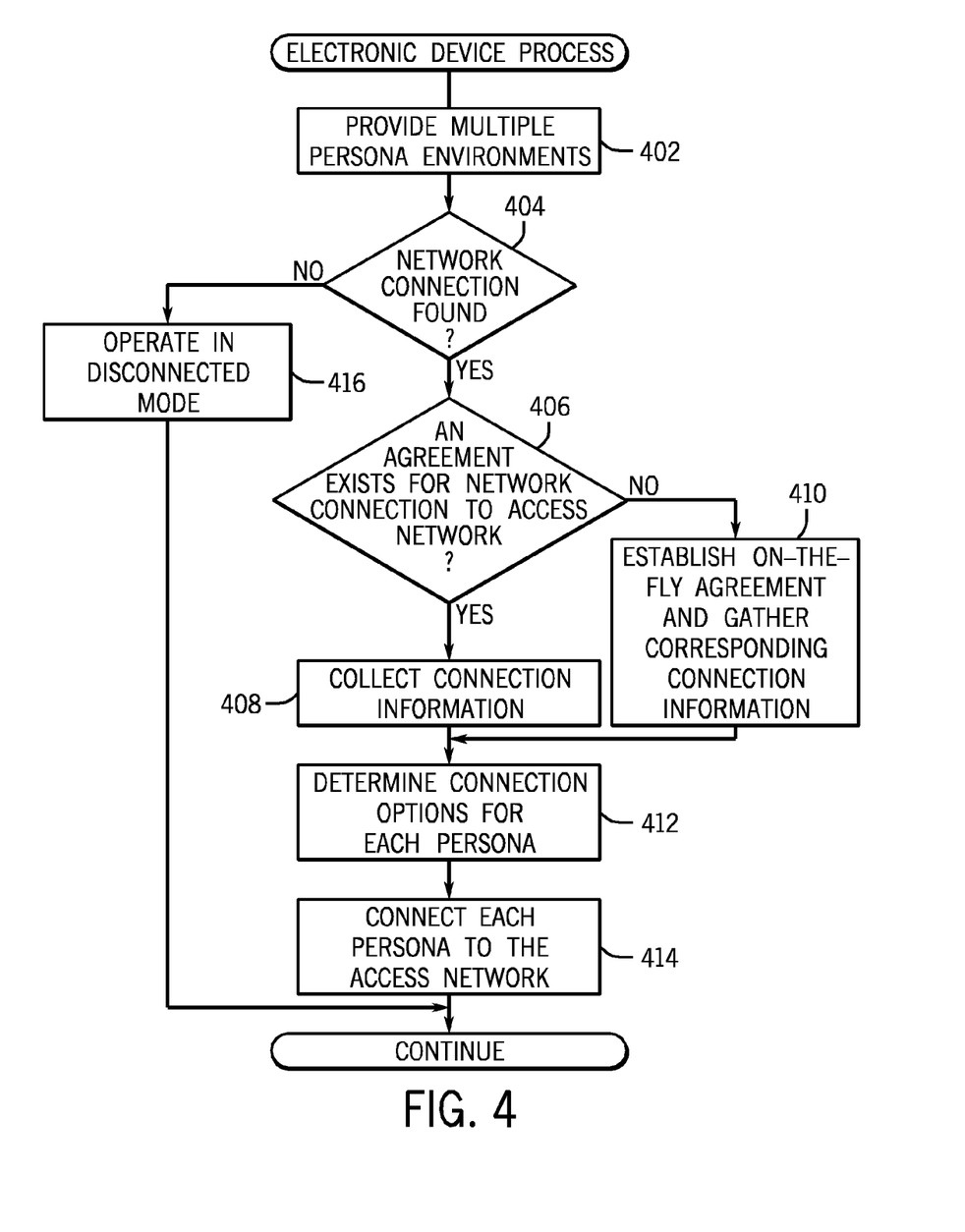
FIG. 4 is a flow diagram of a process of an electronic device, according to some implementations.

FIG. 4 is a flow diagram of a process performed by the electronic device 200 according to some implementations. The electronic device 200 can provide (at 402) multiple persona environments for the different personas of the user, such as environments 202 and 204 in FIG. 2.

The electronic device 200 further searches (at 404) for network connection(s) to one or multiple access networks. For each access network to which the electronic device 200 has a network connection, the electronic device 200 determines (at 406) if an agreement(s) exists between the user and the corresponding service provider. For example, if the electronic device 200 detects a network connection to the enterprise access network 212 (FIG. 2), then the determination at 406 can attempt to identify the existence of an agreement between the work persona of the user and the enterprise service provider that governs data communication for the primary persona (work persona). In examples where multiple personas have corresponding agreements with a given access network, the determination at 406 can identify the multiple agreements of the multiple personas.

If at least one agreement exists, then connection information of the agreement is collected (at 408), such as information relating to a transport flow (VLAN, MPLS LSP network, pseudo-wire, IP-security VPN, etc.), data encapsulation techniques, security policy, and so forth. On the other hand, if no agreement can be identified (at 406), then an on-the-fly agreement can be established (at 410), and the connection information for such an on-the-fly agreement can be gathered. An on-the-fly agreement refers to an agreement that allows for a user to quickly enroll with the corresponding service provider to allow for use of the access network on a temporary basis (e.g. as a guest).

Next, the connection options for each persona of the electronic device 200 are determined (at 412). For a given access network, the connection options of the primary persona are governed by the direct agreement between the primary persona and the corresponding service provider, while the connection options of the secondary persona are governed by the inter-service provider agreement (or alternatively by an agreement between the secondary persona and the corresponding service provider of the given access network). The connection options can be derived from the rights, privileges, resources, and/or connection types specified in the respective agreement. Each persona is then connected (at 414) to the access network according to the connection options.

If no network is found (at 404), then the electronic device 200 can operate (at 416) in disconnected or local mode.

Figure 5:
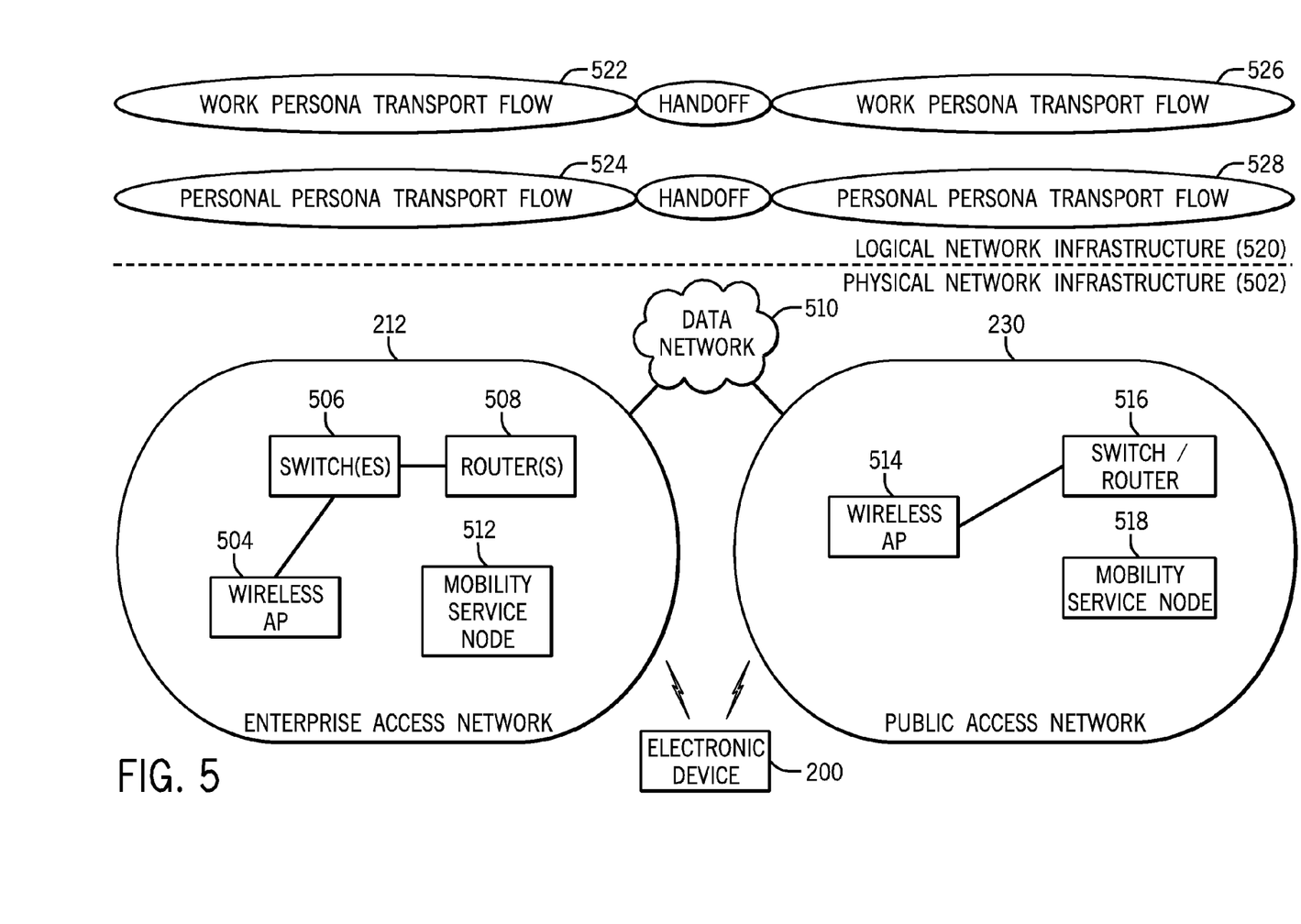
FIG. 5 is a block diagram of an example network arrangement according to further implementations.

FIG. 5 is a block diagram of a further example network arrangement. In the FIG. 5 arrangement, a physical network infrastructure 502 includes the enterprise access network 212 and the public access network 230. The enterprise access network 212 includes wireless access point(s) 504 and switch(es) 506. The wireless access point(s) 504 in the enterprise access network 212 can use WiFi technology or any other wireless communication technology (including cellular technology or other wireless technology). As further shown in FIG. 5, the enterprise network 212 can also include a router(s) 508 to allow communications with a data network 510.

A wireless access point 504 allows wireless connectivity by the electronic device 200 (and any other electronic device within the coverage area of the wireless access point). The enterprise network 212 also includes a mobility service node 512, which is able to manage mobility of electronic devices in the enterprise network 212. For example, the electronic device 200 can move between coverage areas of respective wireless access points 504 in the enterprise network 212. The mobility service node 512 is able to manage handoff of the electronic device 200 between the wireless access points 504. In some examples, the mobility service node 512 can be a standalone node, or alternatively, can be part of any one or combination of the wireless access point 504, switch 506, router 508, and even the electronic device 200. The mobility service node 512 can include the mobility management module 226 or 236 of FIG. 2, for example.

The public access network 230 also includes wireless access point(s) 514, switch(es)/router(s) 516, and a mobility service node 518. When the electronic device 200 is attached to the public access network 230, the electronic device 200 communicates through the public access network 230 with the data network 510. The wireless access point(s) 514 in the public access network 230 can use WiFi technology, cellular technology (e.g. 3G, 4G, or beyond technology), or any other wireless communication technology.

The electronic device 200 can selectively attach to either or both of the enterprise access network 212 and the public access network 230, depending upon the location of the electronic device 200. In some examples, as the electronic device 200 moves to different locations, the electronic device 200 can move into or out of coverage areas associated with the enterprise access network 212 and the public access network 230. In some cases, the electronic device 200 can be located at a location that is within the coverage areas of both the enterprise access network 212 and the public access network 230, in which case the electronic device 200 can potentially attach to both the enterprise access network 212 and the public access network 230.

FIG. 5 also shows a logical network infrastructure 520 that can be implemented on the physical network infrastructure 502. The logical network infrastructure 520 includes transport flows 522 and 524 that can be provided on the enterprise access network 212 for carrying data associated with different personas of the user of the electronic device 200. In addition, the logical network infrastructure 520 additionally includes transport flows 526 and 528, which can be implemented on the public access network 230, for carrying data associated with different personas of the user of the electronic device 200. The transport flows 522, 524, 526, and 528 can include VLANs, MPLS LSP networks, pseudo-wires, IP-security VPN, and so forth.

Depending upon which of the enterprise access network 212 and public access network 230 the electronic device 200 is attached to, handoff of data communications can be performed between the transport flows implemented on the enterprise access network 212 and the public access network 230. As an example, if the electronic device 200 were to leave the enterprise access network 212 and enter the public access network 230, then a handoff is performed where the transport flows 526 and 528 are used to transport data of the electronic device 200 rather than the transport flows 522 and 524. Handoff is managed by the mobility service node 512 in the enterprise access network 212, and the mobility service node 518 in the public access network 230. The policies associated with the handoff can be specified according to the agreement between the enterprise service provider and the public access network service provider.

Figure 6:
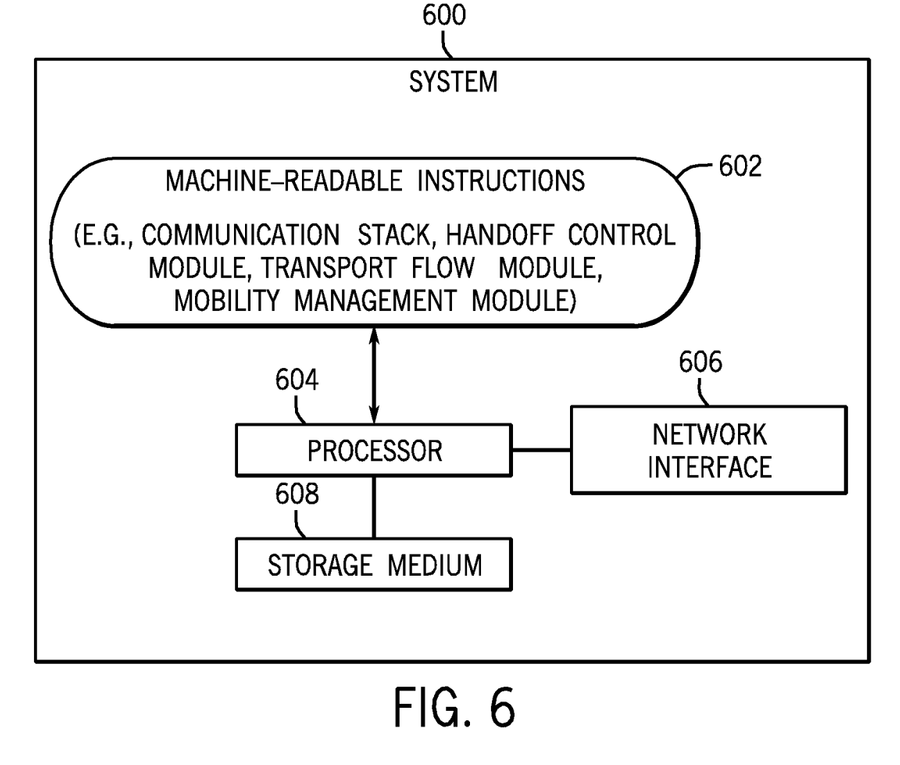
FIG. 6 is a block diagram of a system incorporating some implementations.

FIG. 6 is a block diagram of an example system 600. The system 600 can be the electronic device 200 of FIG. 2, or a network node in the access network 212 or 230 of FIG. 2 or 5. The system 600 includes machine-readable instructions 602, which can represent the communication stacks 208 and 218 depicted in FIG. 2, the handoff control module 228, the transport flow module 224 or 234, the mobility management module 226 or 236, and other instructions to perform various tasks as discussed above.

The machine-readable instructions 602 are executable on one or multiple processors 604, which can be connected to a network interface 606 to communicate over a data network, and to a storage medium (or storage media) 608 to store data. A processor can include a microprocessor, microcontroller, processor module or subsystem, programmable integrated circuit, programmable gate array, or another control or computing device.

The storage medium (or storage media) 608 can be implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. An electronic device comprising:
a plurality of communication stacks to communicate data for plural personas of a user of the electronic device over corresponding transport flows over at least a first access network provided by a first service provider and a second access network provided by a second service provider; and
at least one processor to:
   determine connection options for the plural personas, where the determining comprises:
      determining connection options for a first of the plural personas for communicating data in a first of the transport flows over the first access network based on a first direct agreement between the first persona and the first service provider,
      determining connection options for a second of the plural personas for communicating data in a second of the transport flows over the second access network based on a second, different direct agreement between the second persona and the second service provider, and
      determining, responsive to a determination that no direct agreement exists between the second persona and the first service provider while the electronic device is attached to both the first and second access networks, connection options for the second persona for communicating data over the first access network based on an agreement between the first and second service providers; and
   while the electronic device is attached to both the first and second access networks, cause communication of data in the respective first and second transport flows over the respective first and second access networks.

2. The electronic device of claim 1, wherein the at least one processor is to further perform a handoff to hand off the electronic device from the first access network to the second access network in response to movement of the electronic device, and wherein the handoff is governed by the agreement between the first and second service providers.

3. The electronic device of claim 2, wherein the at least one processor is to further:
determine, based on the agreement between the first and second service providers, connection options for the first persona for communication of data for the first persona in the second access network.

4. The electronic device of claim 1, wherein the plurality of communication stacks are to communicate data according to the determined connection options in the transport flows.

5. The electronic device of claim 1, wherein the plurality of communication stacks has connection points with which respective ones of the transport flows are established, and wherein the connection points are identified by one or some combination of Medium Access Control (MAC) addresses, Internet Protocol (IP) addresses, and Transmission Control Protocol (TCP) ports.

6. An article comprising at least one non-transitory machine-readable storage medium storing instructions that upon execution cause an electronic device to:
communicate, using respective communication stacks in the electronic device, data of different personas of a user of the electronic device in respective separate transport flows over at least a first access network provided by a first service provider and a second access network provided by a second service provider; and
determine connection options for the different personas, where the determining comprises:
   determining connection options for a first of the different personas for communicating data in a first of the transport flows over the first access network based on a first direct agreement between the first persona and the first service provider,
   determining connection options for a second of the plural personas for communicating data in a second of the transport flows over the second access network based on a second, different direct agreement between the second persona and the second service provider, and
   determining, responsive to a determination that no direct agreement exists between the second persona and the first service provider while the electronic device is attached to both the first and second access networks, connection options for the second persona for communicating data over the first access network based on an agreement between the first and second service providers; and
while the electronic device is attached to both the first and second access networks, cause communication of data in the respective first and second transport flows over the respective first and second access networks.

7. The article of claim 6, wherein the instructions upon execution cause the device to further:
perform a handoff to hand off the electronic device from the first access network to the second access network in response to movement of the electronic device, and wherein the handoff is governed by the agreement between the first and second service providers.

8. The article of claim 6, wherein the instructions upon execution cause the device to further:
determine, based on the agreement between the first and second service providers, connection options for the first persona for communication of data for the first persona in the second access network.

9. The article of claim 6, wherein the first persona is a primary persona for the first access network, and the second persona is a secondary persona for the first access network, and wherein the primary persona has the first agreement that is a direct agreement with the first service provider, and the second persona is without a direct agreement with the first service provider.

10. The article of claim 6, wherein the first persona is a work persona relating to communications of the user associated with work for an enterprise, and the second persona is a personal persona relating to personal communications of the user.

11. A method comprising:
communicating, by an electronic device using respective communication stacks in the electronic device, data of different personas of a user of the electronic device in respective separate transport flows over at least a first access network provided by a first service provider and a second access network provided by a second service provider; and
determining, by the electronic device, connection options for the different personas, where the determining comprises:
   determining connection options for a first of the different personas for communicating data in a first of the transport flows over the first access network based on a first direct agreement between the first persona and the first service provider, determining connection options for a second of the plural personas for communicating data in a second of the transport flows over the second access network based on a second, different direct agreement between the second persona and the second service provider, and determining, responsive to a determination that no direct agreement exists between the second persona and the first service provider while the electronic device is attached to both the first and second access networks, connection options for the second persona for communicating data over the first access network based on an agreement between the first and second service providers; and while the electronic device is attached to both the first and second access networks, causing, by the electronic device communication of data in the respective first and second transport flows over the respective first and second access networks.

12. The method of claim 11, further comprising:

performing a handoff to hand off the electronic device from the first access network to the second access network in response to movement of the electronic device, and wherein the handoff is governed by the agreement between the first and second service providers.

13. The method of claim 11, further comprising:

determining, based on the agreement between the first and second service providers, connection options for the first persona for communication of data for the first persona in the second access network.

* * * * *